(12) United States Patent
Haupt et al.

(10) Patent No.: US 7,958,985 B2
(45) Date of Patent: Jun. 14, 2011

(54) PARKING LOCK GEAR FOR A PARKING LOCK ARRANGEMENT

(75) Inventors: Josef Haupt, Tettnang (DE); Tobias Miller, Waldburg (DE); Reinhard Schneider, Wadgassen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 463 days.

(21) Appl. No.: 12/107,197

(22) Filed: Apr. 22, 2008

(65) Prior Publication Data

US 2008/0302629 A1 Dec. 11, 2008

(30) Foreign Application Priority Data

Jun. 6, 2007 (DE) .................. 10 2007 026 428
Feb. 11, 2008 (DE) .................. 10 2008 000 263

(51) Int. Cl.
*B60T 1/06* (2006.01)

(52) U.S. Cl. ......... 192/219.5; 188/31; 74/411.5; 74/447

(58) Field of Classification Search ............... 192/219.4, 192/219.5; 74/447

See application file for complete search history.

(56) References Cited

U.S. PATENT DOCUMENTS

| 519,781 | A | * | 5/1894 | Richards | 474/47 |
| 2,875,856 | A | * | 3/1959 | Mrlik et al. | 188/69 |
| 3,168,836 | A | * | 2/1965 | Militana | 474/152 |
| 4,197,759 | A | * | 4/1980 | Krebs et al. | 74/447 |
| 4,439,172 | A | * | 3/1984 | Segawa | 474/160 |
| 5,893,439 | A | | 4/1999 | Park | |
| 6,419,068 | B1 | * | 7/2002 | Stephan et al. | 192/219.5 |
| 6,905,004 | B2 | * | 6/2005 | Oppitz et al. | 188/31 |
| 2005/0205386 | A1 | * | 9/2005 | Reed et al. | 192/219.5 |

FOREIGN PATENT DOCUMENTS

| DE | 199 10 576 A1 | 9/2000 |
| DE | 101 31 735 A1 | 1/2003 |

* cited by examiner

*Primary Examiner* — Richard M. Lorence
(74) *Attorney, Agent, or Firm* — Davis & Bujold, P.L.L.C.

(57) ABSTRACT

A parking lock gear (1) for a parking lock arrangement for locking an output shaft of a transmission of a vehicle has teeth (5). An annular element (2) is fixed to the parking lock gear (1) and has outer teeth (3) which engage an actuated locking pawl.

21 Claims, 6 Drawing Sheets

PARKING LOCK GEAR FOR A PARKING LOCK ARRANGEMENT

This application claims priority from German Application Serial No. 10 2008 000 263.1 filed Feb. 11, 2008 and German Application Serial No. 10 2007 026 428.5 filed Jun. 6, 2007.

FIELD OF THE INVENTION

The present invention concerns a parking lock gear for a parking lock arrangement for locking an output shaft of a transmission of a vehicle.

BACKGROUND OF THE INVENTION

From automotive technology parking lock arrangements for automatic vehicle transmissions are well known. The known parking lock arrangements usually comprise a parking lock gear with teeth. An actuated locking pawl can be engaged in these teeth, when desired, in order to lock the parking lock gear, which is connected in a rotationally fixed manner to an output shaft of a transmission. This ensures that when the vehicle transmission is in a parking position, the vehicle cannot be moved.

To actuate the locking pawl, a locking cone system is customarily used in which a locking cone can be displaced on a connecting element against the force of a spring device. To engage the parking lock, a driver of the vehicle moves a selector lever to the parking position, where the connecting element is moved by way of a selector shaft and a slotted disc connected in a rotationally fixed manner to the latter. The movement of the selector lever thus axially displaces the connecting element, such that the locking cone, together with the connecting element, is pushed under the locking pawl in order to actuate the locking pawl. In this way, the locking pawl can engage the teeth of the parking lock gear and lock the parking lock gear and the output shaft of the transmission, which is connected in a rotationally fixed manner thereto.

In the described arrangement, the load on the parking lock arrangement is proportional to the diameter of the parking lock gear in which the locking pawl engages. Since the parking lock arrangement is intended for use with a variety of vehicles, each with different weight and drivetrain transmission ratios, the known parking lock arrangement makes it necessary to carry out elaborate and costly adaptation of the diameter of the parking lock gear and the respective transmission to the load being applied in each case.

Thus, the purpose of the present invention is to propose a parking lock gear for a parking lock arrangement of the general type described at the start, which can be universally used with different types of vehicle and transmission sizes without the need for elaborate adaptations to the transmission in each case.

SUMMARY OF THE INVENTION

Accordingly, a parking lock gear of a parking lock arrangement for locking an output shaft of a vehicle is proposed, which has a tooth array in which an actuated locking pawl can be brought into engagement and at least one annular element with an external tooth array being attached onto the parking lock gear.

In a simple manner, enables an additional gear, that increases the diameter of the original parking lock gear, to be fitted onto the existing parking lock gear. Consequently, a desired larger, parking lock gear diameter can be produced for the parking lock gear, according to the invention, in order to be able to apply a required load with the parking lock arrangement. In this way, the proposed parking lock gear can also be used for larger transmissions without problems, since the diameter of the parking lock gear can be adapted in a simple manner.

Thus, with the parking lock gear, a modular system is proposed in which the parking lock arrangement can be simply adapted to the assembly situation in each case by selecting the additional annular element. Accordingly, uniform basic components can be used, which leads to a cost reduction.

In the context of an advantageous embodiment of the invention, it can be provided that the additional annular element is fixed on the outer circumference of the parking lock gear in a detachable manner. Thus, regardless of the diameter of the annular element chosen in each case, it can be fixed onto the existing parking lock gear or taken off again quickly and without complication.

Preferably, inner teeth can be provided around the inside circumference of the annular element, which engage with the teeth of the parking lock gear that serve as driving teeth. In this way, the parking lock gear is connected in a rotationally fixed manner to the annular element. Other designs too can be used to connect the two components in a rotationally fixed manner. However, this type of connection is preferred, because the existing teeth on the parking lock gear can be put to use.

To fix the annular element axially onto the outer circumference of the parking lock gear in the context of a next design of the invention, it can be provided that the teeth of the parking lock gear have an axial abutment on at least one of the teeth. This provides axial securing in at least one direction in that the inner teeth of the annular element or a section or (discontinuous) group of inner teeth of the annular element are brought in contact against the abutment of the teeth of the parking lock gear. Such an abutment can be made in a simple manner by recessing or partial stripping the teeth of the parking lock gear. In this case other designs can be used to ensure appropriate axial securing.

According to a further embodiment of the invention, a bayonet sheet ring or the like is provided to fix the annular element in the other axial direction as well. For example, the bayonet sheet ring can have radial projections or suchlike on its inside circumference. The projections, for example made as ring segments, can be twisted into corresponding recesses of the teeth of the parking lock gear. This ensures axial fixing in the other direction as well.

In a further embodiment of the invention, to prevent loosening of the bayonet sheet ring, it can be provided that in each case between neighboring projections there is a tab directed axially. Preferably, several such tabs can be arranged around the circumference of the bayonet sheet ring.

When the bayonet sheet ring is turned, relative to the parking lock gear so that the tabs are respectively arranged between neighboring teeth of the parking lock gear, the tabs can be bent over to secure the bayonet sheet ring so that they are directed radially and fit into the spaces between respective pairs of parking lock gear teeth.

In the proposed parking lock gear, the annular element can also be held by a snap-ring and/or circlip fastener that allows its removal. The annular element can also be attached to the parking lock gear by a weld joint, a caulk connection, a rivet joint or the like.

In another embodiment of the invention, the annular element can be fixed on the parking lock gear in the axial direction by way of at least one retaining ring or the like. Preferably, a circlip can be used as a retaining ring. Other rings, for example split rings, can also be used.

Preferably, the retaining ring or circlip is associated with a recess extending in the circumferential direction at the outer periphery of the parking lock gear. To enable axial fixing of the assembled annular element, the size of the circlip is such that it is located at least partially outside the recess in an unstressed condition. A radially outer area of the circlip can then be in contact with a diameter step on the inside circumference of the ring and a radially inner area of the circlip can be held in the recess. Consequently, because the annular element axially abuts the parking lock element on one side and the circlip on the other side, it is fixed and held axially.

According to a further embodiment of the invention, it can be provided that the recess is, for example, made in the form of a circumferential groove. Regarding the dimensions of the groove, it is important that the depth of the groove in the radial direction is chosen such that in its stressed condition the circlip can be held completely within the groove. In this way, in the stressed condition of the circlip, the annular element can be pushed axially onto the parking lock gear so as to connect it in a rotationally fixed manner to the parking lock gear.

To enable a particularly simple assembly of the annular element, it can be provided that the inner teeth of the annular element are missing, at least in some sections. Then, the toothless sections can serve as assembly gaps so that, with the aid of an assembly tool, the circlip can be pressed fully into the associated groove, allowing the annular element to be pushed axially onto the parking lock gear while this is so. In addition, the annular element, which is at least partially accessible both axially and radially, can be taken off the parking lock gear again without damaging it.

In a further embodiment of the invention, a metering gear can be provided on the axial side on the parking lock gear. It is also conceivable, however, for the metering gear to be arranged on the annular element, on the locking ring or even on the bayonet sheet ring on the axial side.

BRIEF DESCRIPTION OF THE DRAWINGS

The invention will now be described, by way of example, with reference to the accompanying drawings in which.

DETAILED DESCRIPTION OF THE INVENTION

Figure 1:
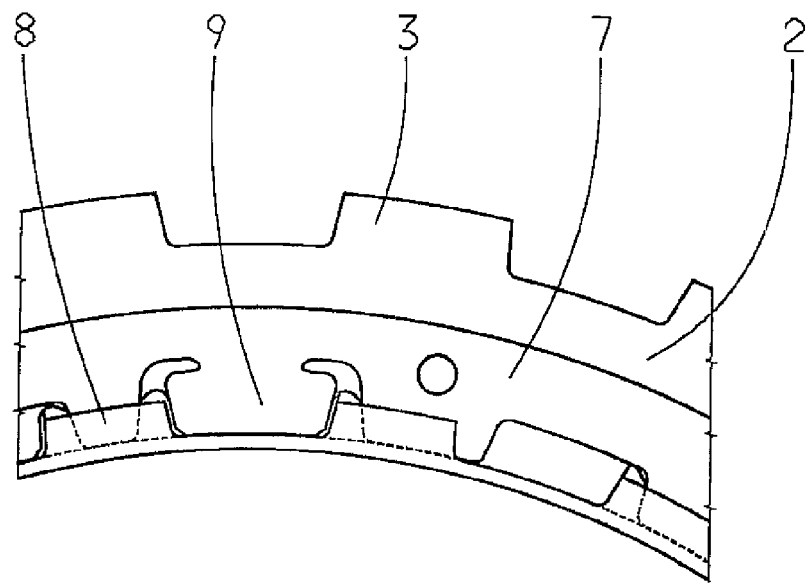
FIG. 1 is a partial view of a first embodiment of a parking lock gear for a parking lock arrangement, according to the invention.

FIGS. 1 to 5 show partial views of a possible embodiment of a parking lock gear 1 for a parking lock arrangement designed to lock an output shaft of a transmission. Since the invention relates to the particular design of the parking lock gear, regardless of the respective design of the parking lock arrangement, the other components customarily used in parking lock arrangements are not indicated further.

FIGS. 1 to 5 show partial views of the first possible embodiment of a parking lock gear 1 of the parking lock arrangement, according to the invention, with an additional annular element 2 to enlarge the outer diameter of the parking lock gear 1. The annular element 2 is fixed detachably onto the outer circumference of the parking lock gear 1.

Around the outer circumference of the annular element 2, there are outer teeth 3 in which the locking pawls (not shown) of the parking lock arrangement can become engaged in order to lock the parking lock gear 1 and the transmission output shaft together in a rotationally fixed manner. Around the inside circumference of the annular element 2, there are inner teeth 4 which engage with the teeth 5 of the parking lock gear 1 that serve as driving teeth. Thus, the annular element 2 is fitted in a rotationally fixed manner on the parking lock gear 1.

Figure 2:
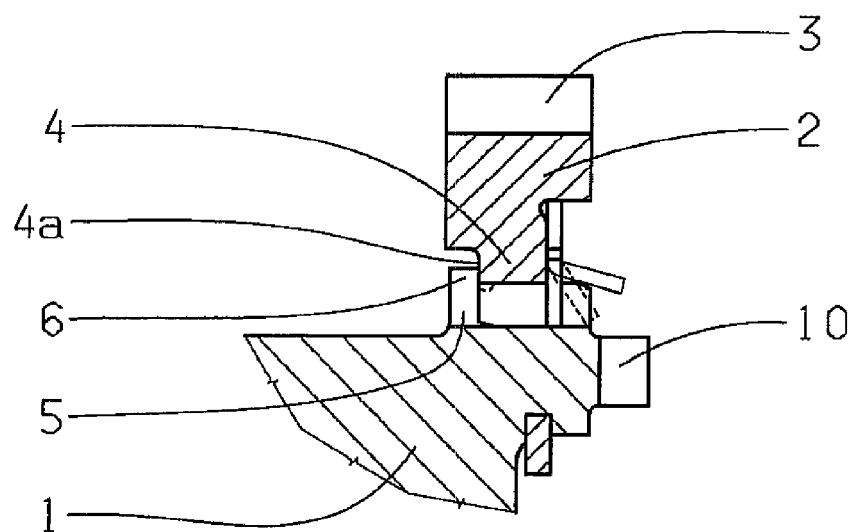
FIG. 2 is a partial view of the first embodiment of a parking lock gear, shown in FIG. 1.

As can be seen from FIGS. 1 and 2, an axial abutment 6 is provided on each of the teeth 5 of the parking lock gear 1. These are produced by partially stripping or recessing the teeth 5 of the parking lock gear 1. A (discontinuous) collar 4a of the inner teeth 4 of the annular element 2 rests against the axial abutments 6 distributed around the circumference of the parking lock gear 1. In this way the annular element 2 is axially secured, first on one side.

Figure 3:
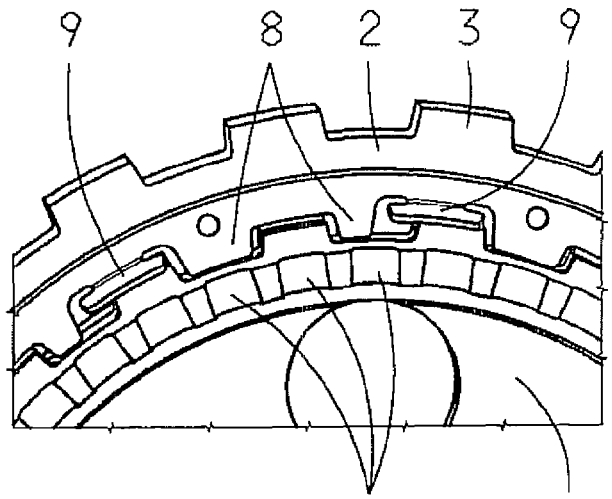
FIG. 3 is a schematic, three-dimensional, partial view of the parking lock gear with an additional annular element during the insertion of a bayonet sheet ring.

To secure the annular element 2 in the other axial direction as well, a sheet metal bayonet ring 7 is provided. Around its inside circumference, the bayonet ring 7 has inwardly directed projections 8 of approximately the ring segment shape. The projections 8 are distributed over the entire circumference of the bayonet ring 7. When axially fitted onto the parking lock gear 1, the projections 8 of the bayonet ring 7 can be inserted between the teeth 5 of the parking lock gear, as shown in FIG. 3.

Figure 4:
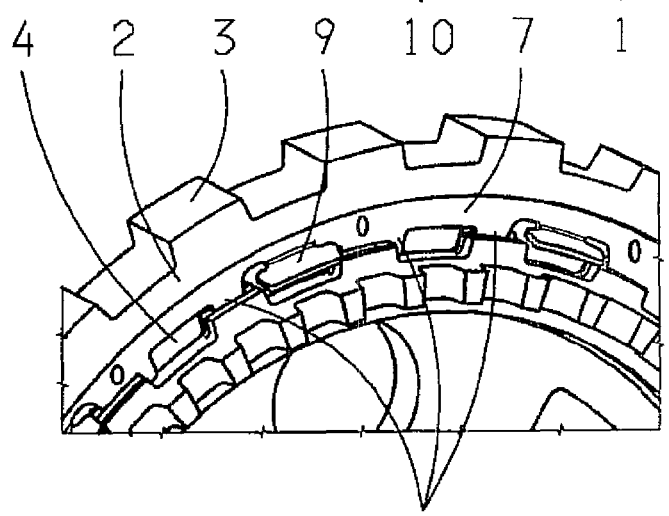
FIG. 4 is a three-dimensional, partial view of the parking lock gear of FIG. 3 during the rotation of the bayonet sheet ring.

Once the bayonet ring 7 has been fitted on, the bayonet ring 7 is turned as shown in FIG. 4. When it is so turned, the projections 8 of the bayonet ring 7 are moved into corresponding recesses between the teeth 5 of the parking lock gear 1 in order to axially secure the annular element 2.

Figure 5:
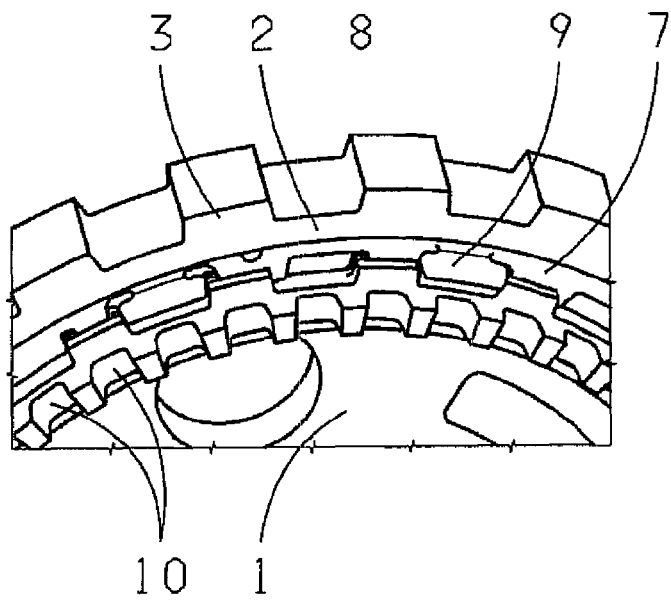
FIG. 5 is a three-dimensional, partial view of the parking lock gear of FIG. 3 during the bending over of the tabs of the bayonet sheet ring.

In addition, between some neighboring projections 8, on its inside circumference the bayonet ring 7 has axially directed tabs 9. As shown in FIG. 5, these tabs 9 can be bent in such a manner that the tabs 9 are directed radially so that they fit between neighboring teeth 5 of the parking lock gear 1. This secures the bayonet ring 7 on the parking lock gear 1 in the circumferential direction. The bending over of the tabs 9 is also illustrated by broken lines in FIG. 2.

FIGS. 6 to 12 show a second embodiment of the parking lock gear 1 according to the invention. In this second embodiment, a retaining ring in the form of a circlip 11 is provided to fix the annular element 2 axially on the parking lock gear 1. This simplifies assembly still more. In addition, dismantling is also possible without damage to the components.

Figure 6:
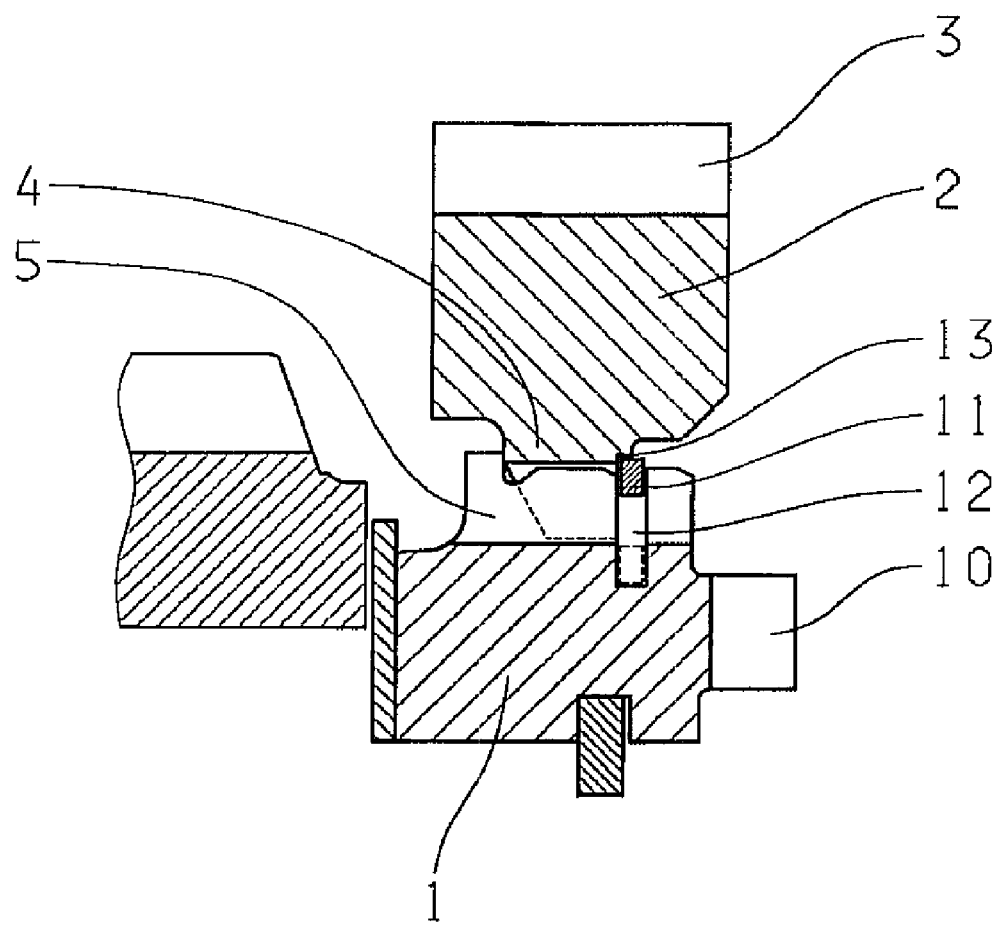
FIG. 6 is a sectioned, partial view of the parking lock gear, according to a second, embodiment of the invention.

FIG. 6 shows a sectioned view of the snap-ring, according to the second embodiment. As in the first embodiment, the annular element 2 is pushed axially onto the parking lock gear 1 so that the inner teeth 4 of the annular element 2 engage in the outer teeth 5 of the parking lock gear 1. In contrast to the first embodiment, in this second embodiment, an all-round groove 12 is provided on the outer circumference of the parking lock gear 1. This groove 12 serves to completely accommodate the circlip 11 for at least part of the time so that the annular element 2 can be axially fixed to the parking lock gear 1. As soon as the inner teeth 4 of the annular element 2 have engaged in the driving teeth 5 of the parking lock gear 1 and the inner teeth 4 of the annular element 2 have come up against the axial abutments 6 of the teeth 5 of the parking lock gear 1, the circlip 11 is radially moved partially out of the groove 12 in order to axially secure the annular element 2. In FIG. 6, the stressed condition of the circlip 11 is indicated using broken lines.

FIGS. 7A to 10B illustrate the assembly sequence of the annular element 2 described above, the difference between the figures indexed A and those indexed B, respectively, being only that in the figures indexed A, in each case the parking lock gear 1 is shown in section in the area between two of the teeth 5, and in the Figures indexed B, in each case the parking lock gear 1 is shown in section along one of the teeth 5.

Figure 7A:
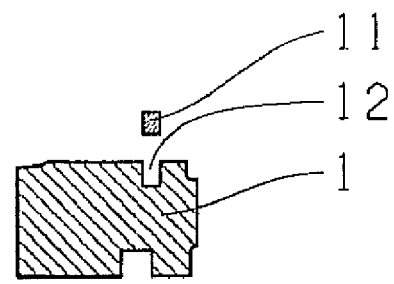
FIG. 7A is a sectioned, partial view of the parking lock gear between two of the outer teeth in the unstressed condition of a retaining ring.
Figure 7B:
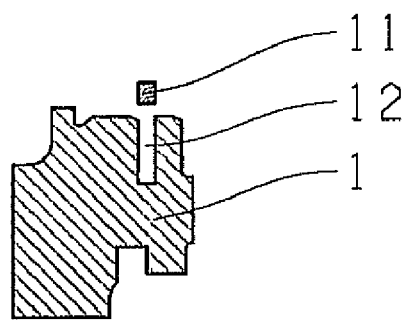
FIG. 7B is a sectioned, partial view of the parking lock gear through an outer tooth in the unstressed condition of the retaining ring.

In FIGS. 7A and 7B, the circlip 11 is in an unstressed condition. In this condition, the circlip 11 projects radially above the provided groove 12. Thus, in this condition, the annular element 2 cannot be axially fitted onto the parking lock gear 1.

Figure 8A:
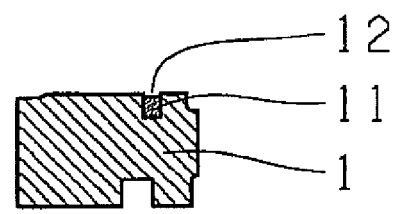
FIG. 8A is a sectioned, partial view of the parking lock gear between two of the outer teeth in the stressed condition of a retaining ring.
Figure 8B:
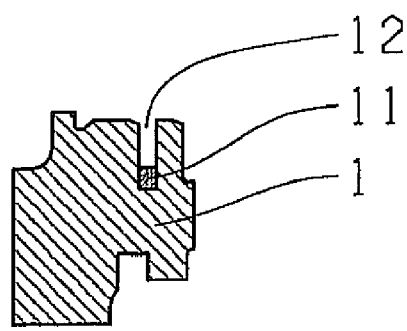
FIG. 8B is a sectioned, partial view of the parking lock gear through the outer tooth in the stressed condition of the retaining ring.

Before or during the fitting of the annular element 2, the circlip 11 is pressed down in the radial direction completely into the associated groove 12, using an assembly device or assembly tool (not shown). The circlip 11 is then stressed as shown in FIGS. 8A and 8B.

Figure 9A:
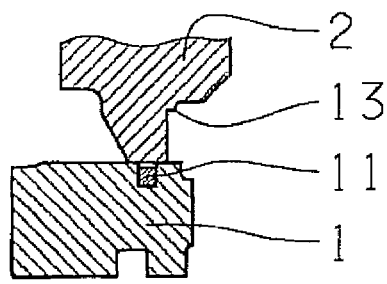
FIG. 9A is a sectioned, partial view of the parking lock gear between two outer teeth during the axial fitting of the ring element.
Figure 9B:
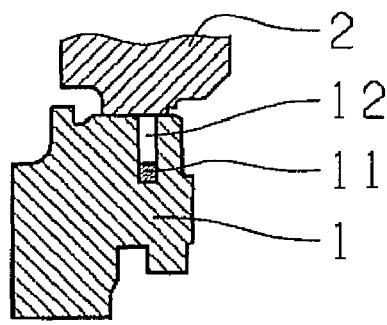
FIG. 9B is a sectioned, partial view of the parking lock gear through an outer tooth during the axial fitting of the ring element.

In FIGS. 9A and 9B, the assembly process of the annular element 2 is illustrated. These Figures clearly show that the annular element 2 is pushed axially onto the parking lock gear 1. This is possible without difficulty because the circlip 11 is wholly inside the groove 12.

Figure 10A:
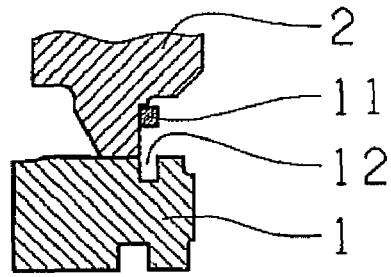
FIG. 10A is a sectioned, partial view of the parking lock gear between two outer teeth with the annular element in its axially fixed condition.
Figure 10B:
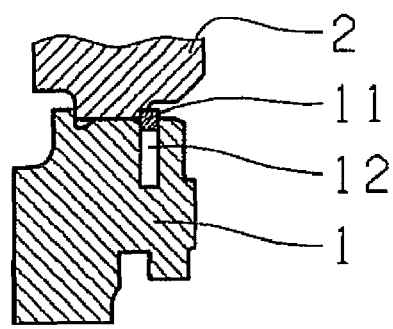
FIG. 10B is a sectioned, partial view of the parking lock gear through an outer tooth with the annular element in its axially fixed condition.

FIGS. 10A and 10B show the annular element 2 ready-fitted on the parking lock gear 1. In this condition, the circlip 11 is again unstressed and rests with its outer circumference axially and radially against a step 13 in the annular element 2. At the same time, the circlip 11 is still at least partially held within the groove 12. Thus, the annular element 2 is held axially in contact with the abutment of the parking lock gear 1 on one side and with the axially fixed circlip 11 on the other side. This ensures that the annular element 2 is axially secured.

Figure 11:
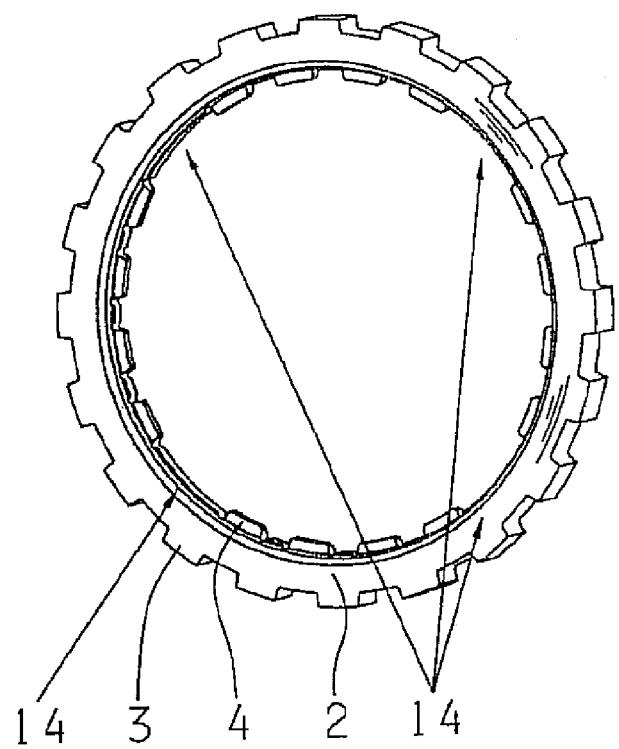
FIG. 11 is a perspective, detail view of the annular element.
Figure 12:
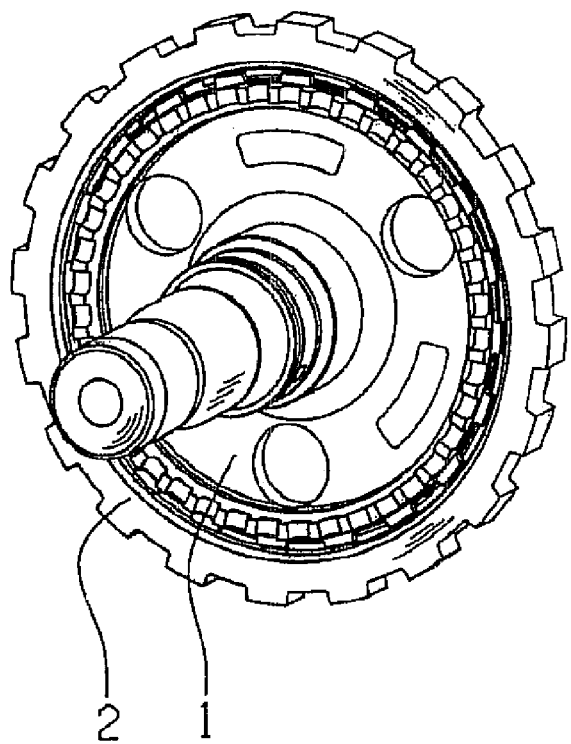
FIG. 12 is a perspective view of the parking lock arrangement in the assembled condition.

FIG. 11 shows the annular element 2 on its own. This view clearly shows that, among the inner teeth 4 of the annular element 2, several sections 14, distributed around the circumference, are left without teeth. The sections 14 are formed simply by omitting a number of teeth on the inside circumference of the annular element 2. The toothless sections 14 are provided as assembly gaps, meaning that the circlip 11 can be pressed or held radially in the groove 12 through the sections 14, for example with the help of an assembly tool, in order to stress the circlip 11. FIG. 12 shows the annular element 2 fixed axially onto the parking lock gear 1.

In the example embodiments shown in FIGS. 1 to 11, in each case the metering gear 10 is axially fixed onto the parking lock gear 1.

REFERENCE NUMERALS 1 parking lock gear
2 annular element
3 outer tooth array
4 inner tooth array
4a collar
5 tooth array
6 axial abutment
7 bayonet ring
8 projections
9 tabs
10 metering gear
11 circlip
12 groove
13 step
14 toothless sections of the inner tooth array

The invention claimed is:

1. A parking lock gear (1) for a parking lock arrangement for locking an output shaft of a transmission of a vehicle, the parking lock gear (1) comprising radially exterior teeth (5),
    at least one annular element (2) comprising a set of radially outer teeth (3) and a set of radially inner teeth (4), and the radially inner teeth (4) of the at least one annular element (2) directly engage with the radially exterior teeth (5) of the parking lock gear (1) to rotationally fix the annular element (2) to the parking lock gear (1) so as to prevent relative rotation of the annular element (2) with respect to the parking lock gear (1), and
    an actuated locking pawl being engagable with the radially outer teeth (3) of the at least one annular element (2) to lock the transmission output shaft;
    wherein the radially exterior teeth (5) are spaced such that, in an absence of the annular element (2), the actuated locking pawl matingly fits between adjacent exterior teeth (5) of the parking lock gear (1).

2. The parking lock gear (1) according to claim 1, wherein the annular element (2) is fixed detachably on an outer circumference of the parking lock gear (1).

3. The parking lock gear (1) according to claim 1, wherein flanks of the radially inner teeth (4) of the at least one annular element (2) directly engage with flanks of the radially exterior teeth (5) of the parking lock gear (1).

4. The parking lock gear (1) according to claim 3, wherein at least one of the teeth (5) of the parking lock gear (1) has an axial abutment (6) and the inner teeth (4) of the annular element (2) can be brought axially into contact with the abutment (6) of the teeth (5) of the parking lock gear (1).

5. The parking lock gear (1) according to claim 4, wherein a portion of the inner teeth (4) of the annular element (2) is secured between the axial abutment (6 and an additional retaining element (7, 11).

6. The parking lock gear (1) according to claim 1, wherein a bayonet ring (7) is provided for the axial securing of the annular element (2).

7. The parking lock gear (1) according to claim 6, wherein an inside circumference of the bayonet ring (7) has inward-directed projections (8).

8. The parking lock gear (1) according to claim 7, wherein to secure the annular element (2) axially, the projections (8) of the bayonet ring (7) can be turned into corresponding recesses between the teeth (5) of the parking lock gear (1).

9. The parking lock gear (1) according to claim 7, wherein tabs (9) extend axially from the bayonet ring (7), at predetermined intervals about the inside circumference of the bayonet ring (7) and between the projections (8).

10. The parking lock gear (1) according to claim 9, wherein the bayonet ring (7) can be rotated relative to the parking lock gear (1) in such a manner that the tabs (9) are, in each case, positioned between adjacent teeth (5) of the parking lock gear (1) so that the tabs (9) can be bent in the radial direction in order to secure the bayonet ring (7).

11. The parking lock gear (1) according to claim 1, wherein at least one of a snap-ring and a circlip (11) fastener is provided for the detachable fixing of the annular element (2) to the parking lock gear (1).

12. The parking lock gear (1) according to claim 1, wherein the annular element (2) is fixed to the parking lock gear (1), in an axial direction, by at least one retaining ring.

13. The parking lock gear (1) according to claim 12, wherein the retaining ring is a circlip (11).

14. The parking lock gear (1) according to claim 13, wherein the circlip (11) is arranged in a recess provided on an outer circumference of the parking lock gear (1) which extends all round in the circumferential direction.

15. The parking lock gear (1) according to claim 14, wherein the circlip (11), in an unstressed condition, is located partially outside the recess and axially secures the annular element (2).

16. The parking lock gear (1) according to claim 15, wherein the circlip (11) is in contact with a step (13) of the annular element (2), at least over a radially outer area, and is held by at least a radially inner area in the recess.

17. The parking lock gear (1) according to claim 13, wherein the recess is an all-round groove (12).

18. The parking lock gear (1) according to claim 17, wherein the groove (12) has a depth, in a radial direction, so that the circlip (11), in an stressed condition, is fully accommodated within the groove (12).

19. The parking lock gear (1) according to claim 12, wherein at least one toothless section is provided wherein a number of inner teeth (4) are omitted.

20. The parking lock gear (1) according to claim 19, wherein the at least one toothless section (14) of the inner teeth array (4) is formed by an assembly gap.

21. The parking lock gear (1) according to claim 1, wherein a metering gear (10) is arranged axially on one of the parking lock gear (1), the annular element (2), a circlip (11) and a bayonet ring (7).

* * * * *